(12) United States Patent
Statz et al.

(10) Patent No.: US 7,375,151 B2
(45) Date of Patent: *May 20, 2008

(54) HIGHLY-RESILIENT THERMOPLASTIC COMPOSITIONS

(75) Inventors: Robert Joseph Statz, Kennett Square, PA (US); John Chu Chen, Hockessin, DE (US); John Francis Hagman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 168 days.

This patent is subject to a terminal disclaimer.

(21) Appl. No.: 10/962,728

(22) Filed: Oct. 12, 2004

(65) Prior Publication Data

US 2005/0148725 A1 Jul. 7, 2005

Related U.S. Application Data

(63) Continuation-in-part of application No. 09/960,208, filed on Sep. 22, 2001, now Pat. No. 6,815,480, which is a continuation-in-part of application No. 09/422,142, filed on Oct. 21, 1999, now abandoned.

(60) Provisional application No. 60/105,065, filed on Oct. 21, 1998, provisional application No. 60/105,232, filed on Oct. 21, 1998, provisional application No. 60/105,193, filed on Oct. 22, 1998, provisional application No. 60/105,181, filed on Oct. 22, 1998.

(51) Int. Cl.
*C08K 5/09* (2006.01)
*C08L 33/02* (2006.01)
*A63B 37/02* (2006.01)
*A63B 37/00* (2006.01)

(52) U.S. Cl. .................. 524/322; 524/394; 524/399; 524/400; 525/92 A; 525/176; 525/221; 473/372; 473/373; 473/385

(58) Field of Classification Search .................. None
See application file for complete search history.

(56) References Cited

U.S. PATENT DOCUMENTS 6,100,321 A * 8/2000 Chen .................. 524/400
6,815,480 B2   11/2004 Statz et al.

FOREIGN PATENT DOCUMENTS

GB    2164342       * 3/1986
WO    WO 98/46671   * 10/1998

* cited by examiner

*Primary Examiner*—David J. Buttner (57) ABSTRACT

A thermoplastic composition is provided, comprising (a) an acid copolymer, (b) a salt of a high molecular weight, monomeric organic acid; (c) a thermoplastic resin; (d) a cation source; and (e) optionally, a filler. Also provided are one-, two- and three-piece golf balls, and multi-layered golf balls comprising the composition of the invention.

10 Claims, 4 Drawing Sheets

HIGHLY-RESILIENT THERMOPLASTIC COMPOSITIONS

CROSS-REFERENCES TO RELATED APPLICATIONS

This application is a continuation in part of U.S. patent application Ser. No. 09/960,208, U.S. Pat. No. 6,815,480 filed on Sep. 22, 2001, which, in turn, is a continuation in part of U.S. patent application Ser. No. 09/422,142, filed on Oct. 21, 1999, now abandoned, which, in turn, claims the benefit of U.S. Provisional Application Nos. 60/105,065 and 60/105,232, filed on Oct. 21, 1998 and Nos. 60/105,193 and 60/105,181, filed on Oct. 22,1998, each of which is incorporated herein in its entirety.

BACKGROUND OF THE INVENTION

1. Field of the Invention

The invention relates to highly resilient thermoplastic polymer blend compositions, their manufacture and their use as a substitute for thermoset and other materials, particularly in the manufacture of one-, two-, three-piece, and multi-layered golf balls. These compositions are also useful as foamed materials in footware and in other sport balls such as softballs.

2. Description of Related Art

Typically, thermoset materials such as polybutadiene rubber, cross-linked EVA, cross-linked SBS, and cross-linked urethanes have been used in applications where properties such as resilience, durability, and low hardness are needed. For example, polybutadiene rubber has traditionally been used in the cores and centers of golf balls.

There currently exist several types of premium golf balls, particularly three-piece balls, two-piece balls and multi-layered balls. "Three-piece" balls typically have a spherical molded center, having an elastomeric thread-like material wound around it, covered with either a thermoplastic or thermoset material. "Two-piece" balls typically have a spherical molded core covered with a thermoplastic material. "Multi-layered" balls typically have a core and one or more intermediate layers or mantles between the core and a cover.

The material used to mold the three-piece centers and the two-piece and multi-layer cores has traditionally been a thermoset rubber such as polybutadiene rubber. There are, however, major disadvantages in using thermoset rubbers such as the inability to recycle scrap materials and the need for complex multi-step manufacturing processes. There has been only limited success in attempts to replace the thermoset materials with more-easily-processed thermoplastic materials, the scrap of which can be recycled.

Also, three-piece balls, two-piece balls, and multi-layered balls are by their very nature more complicated and costly to manufacture than the long sought after one-piece golf ball. Attempts to make a premium one-piece ball have heretofore not been successful. Limited-flight range balls, however, have been produced from thermoset rubber and from certain thermoplastic material as set forth in U.S. Pat. No. 5,155,157.

U.K. Patent Application 2,164,342A describes one attempt to replace centers and cores and achieve a one-piece golf ball. It teaches moldable compositions comprising ionic copolymers (or potentially ionizable acid copolymers) blended with certain thermoplastic materials such as a polyether block copolyamide, polyether block copolyester and the like. Those compositions are said to be useful as three-piece centers, two-piece cores and one-piece solid golf balls, but they lack properties such as durability. Also, U.S. Pat. No. 5,155,157 describes a thermoplastic material for cores, centers and one-piece balls. The resins described in this patent can be molded into golf ball parts but the resulting balls are too hard and not resilient enough to perform as a premium golf ball and they are probably too expensive.

There still exists the need for a thermoplastic material that is resilient and durable enough with a low enough hardness or compression to be useful as a three-piece center, two-piece core, a one-piece golf ball, and in cores and mantles in a multi-layered golf ball in premium golf balls. In particular, there is a need for a thermoplastic material that provides economic advantages relative to the materials now known in the art.

SUMMARY OF THE INVENTION

The subject invention provides thermoplastic compositions having high resilience, methods of manufacturing such compositions, and products made therefrom, such as components of one-, two- and three-piece golf balls or multi-layered golf balls, sport balls and footware.

More specifically, the thermoplastic composition of this invention is a composition comprising (a) an ethylene, $C_{3-8}$ $\alpha,\beta$-ethylenically unsaturated carboxylic acid copolymer; (b) a high molecular weight, monomeric organic acid or salt thereof; (c) a thermoplastic resin; (d) a cation source; and (e) a filler (optionally present). Preferably, component (b) is present at about 10 to about 45 weight percent (wt. %) of (a), (b) and (c) provided that component (b) does not exceed 50 wt. % of (a) plus (b); component (c) is present at about 1 to about 35 wt. % of (a), (b) and (c); and (d) is present at a level sufficient to neutralize 80 to 110 (preferably 90 to 110, or 95 to 110) percent of the combined acid content of (a) and (b). Component (e) is optionally added as needed to adjust density in a preferred range of up to 60 parts per 100 parts by weight of components (a) through (d).

The present invention further provides golf ball components, particularly cores, centers, and mantles (one or more layers between the cover and the central portion of ball) and one piece golfballs, comprising the compositions of (a) an ethylene, $C_{3-8}$ $\alpha,\beta$-ethylenically unsaturated carboxylic acid copolymer; (b) about 10 to about 45 weight percent (wt. %) of (a), (b) and (c) provided that component (b) does not exceed 50 wt. % of (a) plus (b) of a high molecular weight, monomeric organic acid or salt thereof; (c) about 1 to about 35 wt. % of (a), (b) and (c) of a thermoplastic resin; (d) a cation source present at a level sufficient to neutralize 50 to 110 (preferably 80 to 110, 90 to 110, or 95 to 110) percent of the combined acid content of (a) and (b); and optionally (e) a filler in a preferred range of up to 60 parts per 100 parts by weight of components (a) through (d).

Preferable ranges, particularly for use in golf ball components, for components (a) through (e) are as set forth in the following table. Component (a) is always present and component (d), in each case, is present at a level sufficient to neutralize 50 to 110 percent or the combined acid content of (a) and (b). Percentages of (b) and (c) are the approximate weight percentages based on the total weight of (a) through (c). Component (e) is reported as parts per hundred parts of by weight of (a) through (d). Component (b) should be within the ranges set forth provided that component (b) does not exceed 50 wt. % of (a) plus (b).

| | (b) | (c) | (e) |
|---|---|---|---|
| 1 | 5-40% | 1-35% | 0-60 parts |
| 2 | 5-40% | 1-35% | Sufficient to raise density to 1.14-1.8 gms/cc |
| 3 | 10-30% | 1-30% | Sufficient to raise density to 1.14-1.22 gms/cc |
| 4 | 10-30% | 1-30% | 15-25 parts |
| 5 | 15-30% | 1-25% | 15-35 parts |
| 6 | 18-22% | 1-15% | 18-22 parts |
| 7 | 5-10% | 10-35% | Sufficient to raise density to 1.8 gms/cc |
| 8 | 5-10% | 10-35% | 40-60 parts |
| 9 | 5-10% | 25-35% | 40-55 parts |
| 10 | 5-10% | 28-35% | 50-55 parts |
| 11 | 5-30% | 1-35% | 0-60 parts |

One embodiment of a product using a composition of the invention is a one-piece golf ball comprising (a) ethylene acid copolymer, (b) 10-45 wt. % high molecular weight, monomeric organic acid or salt thereof provided that component (b) does not exceed 50 wt. % of (a) plus (b), (c) 1-30 wt. % thermoplastic resin, (d) sufficient cation to neutralize 50 to 110 percent of the acid in the acid copolymer and organic acid, and (e) sufficient filler, preferably 15-25 parts per hundred weight of polymer (a)-(d), to adjust density of ball to 1.14 grams/cubic centimeter (gm/cc). Preferably the filler has a density of about 4 gm/cc or greater.

Another embodiment of such a product is a two-piece golf ball having a core and a cover. The core is made of a composition comprising (a) ethylene acid copolymer, (b) 10-45 wt. % high molecular weight, monomeric organic acid or salt thereof provided that component (b) does not exceed 50 wt. % of (a) plus (b), (c) 1-30 wt. % thermoplastic resin, (d) sufficient cation to neutralize 50 to 110 percent of the acid in the acid copolymer and organic acid, and (e) sufficient filler, preferably 15-35 parts per hundred parts by weight of (a) through (d), to adjust the density of the core to about 1.18-1.22 gm/cc. The amount of filler can be adjusted to produce a core with a density varying from the 1.18 gm/cc depending on the diameter of the core and the thickness and composition of the cover to produce a golf ball meeting the weight limits (45 grams) set by the professional golfers' governing authority (e.g. U.S. Golf Association). Preferably the filler has a density of about 4 gm/cc or greater.

Another embodiment is a three-piece golf ball having a center, elastomeric wrapping and a cover. The center is made of a composition comprising (a) ethylene acid copolymer, (b) 5-35 wt. % high molecular weight, monomeric organic acid or salt thereof provided that component (b) does not exceed 50 wt. % of (a) plus (b), (c) 10-35 wt. % thermoplastic resin, (d) sufficient cation to neutralize 50 to 110 percent of the acid in the acid copolymer and organic acid, and (e) sufficient filler, preferably 40-60 parts per hundred parts by weight (a) through (d), to adjust the density of the center to about 1.8 gm/cc. As with the two-piece ball, the amount of filler can be adjusted depending on the size, thickness and composition of the other ball components to produce a golf ball of the desired weight (e.g. about 45 grams).

Another embodiment is a multi-layer golf ball having a core and a cover with one or more intermediate layers or mantles between the core and the cover. Sometimes the "core" is referred to in the industry and in this application as a "center." Both the core and the mantle(s) can comprise the composition of this invention. The amount of filler employed in the core and mantle(s) can be varied from 0 to about 60 parts per hundred parts by weight of (a) through (d) depending on the size (thickness) of the components and the desired location of the weight in the ball, provided that the final ball meets the required weight limits. The filler can be used in the core and not in the mantle, in the mantle and not in the core, or in both. Thus, the mantle or the core can comprise (a) ethylene acid copolymer, (b) about 5-30 wt. % high molecular weight, monomeric organic acid or salt thereof provided that component (b) does not exceed 50 wt. % of (a) plus (b), (c) 1-35 wt. % thermoplastic resin, (d) sufficient cation to neutralize 50 to 110 percent of the acid in the acid copolymer and organic acid, and (e) sufficient filler, if needed, to adjust the density to the desired level.

As will be appreciated by one skilled in the art, the present invention allows unique golf ball constructions, which are also the subject of this invention. For example, the weight of the golf ball can be distributed differently than in current golf balls. It is possible to have more weight near the surface of the ball or midway between the center and the surface with a lower density center. It is also possible with the thermoplastic composition of this invention as the core to mold a pattern such as dimples into the core. By doing so, it is possible to obtain a golf ball having a cover with a uniform thickness throughout in contrast to presently available golf balls which have covers that are thinner in the area of the dimples.

DETAILED DESCRIPTION OF THE INVENTION

Several patents and publications are cited in this description in order to more fully describe the state of the art to which this invention pertains. The entire disclosure of each of these patents and publications is incorporated by reference herein.

Because the species and relative ratios of the components used in the practice of the subject invention vary somewhat, particularly when considered based on the type of golf ball desired (i.e., one-piece, two-piece, three-piece or multi-layered ball), it is useful to first consider the components themselves.

Component Descriptions

The following definitions apply to the terms as used throughout this specification, unless otherwise limited in specific instances.

In this disclosure, the term copolymer is used to refer to polymers containing two or more monomers. The term bipolymer or terpolymer refers to polymers containing only two or three monomers respectively. The phrase 'copolymer of various monomers' means a copolymer whose units are derived from the various monomers.

The term "finite amount", as used herein, refers to an amount that is not equal to zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Thermoplastic Resin

The compositions of the invention include at least one thermoplastic resin. Preferably, the weight average molecular weight of the thermoplastic resin ranges from about 80 kD to about 500 kD.

Suitable thermoplastic resins include, without limitation, polyurethanes; polyureas; poly-ether-esters; poly-amide-ethers; polyether-ureas; PEBAX™ block copolymers based on polyether-block-amide, available from Atofina Chemicals, Inc., of Philadelphia, Pa.; styrene-butadiene-styrene (SBS) block copolymers, styrene(ethylene-butylene)-styrene block copolymers, etc.; EPDM; polyamides (oligomeric and polymeric); polyesters; polyolefins including HDPE, LDPE, LLDPE, PP, E/P copolymers, etc.; ethylene copolymers with various comonomers, such as vinyl acetate, alkyl(meth)acrylates, alkyl(meth)acrylic acid, epoxy-functionalized monomer, CO, maleic acid, maleic ester, maleic anhydride, (meth)acrylonitrile, etc.; functionalized polymers with maleic anhydride, epoxy functionality, etc., either by copolymerization or by grafting; metallocene catalyzed PE, PP and ethylene copolymers; ground up powders of the thermoset elastomers; polystyrene and copolymers; and the like, these classes of polymers being well known in the art.

Preferred thermoplastic resins include copolyetheresters, copolyetheramides, elastomeric polyolefins, styrene diene block copolymers, polyurethanes, polyamides, polyesters, polyolefins, ethylene copolymers, anhydride modified ethylene or propylene homopolymers and copolymers, metallocene polyethylene (mPE), and the like.

Certain thermoplastic resins may be further characterized as elastomers. The term "elastomers", as used herein, refers to polymers having one or more elastomeric features. The term "elastomeric features", as used herein, refers to the property of a material of recovering, in whole or in part, one or more of its original dimensions upon removal of a deforming force and continuing to exert a force to recover one or more of its original dimensions if complete recovery is prevented by an opposing force.

Examples of suitable thermoplastic resins that may also be characterized as elastomers include, for example, poly-ether-esters, poly-amide-ethers, polyether-ureas, PEBAX™ block copolymers, elastomeric polyolefins, styrene-butadiene-styrene (SBS) block copolymers, styrene(ethylene-butylene)-styrene block copolymers, and the like.

Preferred thermoplastic elastomers include copolyetheresters, copolyetheramides, elastomeric polyolefins, styrene diene block copolymers and thermoplastic polyurethanes. The copolyetheresters are discussed in detail in U.S. Pat. Nos. 3,651,014; 3,766,146; and 3,763,109, inter alia. The preferred copolyetherester polymers are those wherein the polyether segment is obtained by polymerization of tetrahydrofuran and the polyester segment is obtained by polymerization of tetramethylene glycol and phthalic acid. The more polyether units incorporated into the copolyetherester, the softer the polymer.

The copolyetheramides are also well known in the art as described in U.S. Pat. No. 4,331,786, for example. They are comprised of a linear and regular chain of rigid polyamide segments and flexible polyether segments.

The elastomeric polyolefins are polymers composed of ethylene and higher primary olefins such as propylene, hexene, octene and optionally 1,4-hexadiene and or ethylidene norbornene or norbornadiene. The elastomeric polyolefins can be functionalized with maleic anhydride.

Thermoplastic polyurethanes are linear or slightly chain branched polymers consisting of hard blocks and soft elastomeric blocks. They are produced by reacting soft hydroxy terminated elastomeric polyethers or polyesters with diisocyanates such as methylene diisocyanate (MDI) or toluene diisocyanate (TDI). These polymers can be chain extended with glycols, diamines, diacids, or amino alcohols. The reaction products of the isocyanates and the alcohols are called urethanes and these blocks are relatively hard and high melting. These hard high melting blocks are responsible for the thermoplastic nature of the polyurethanes.

Block styrene diene copolymers are composed of polystrene units and polydiene units. The polydiene units are derived from polybutadiene, polyisoprene units or copolymers of these two. In the case of the copolymer it is possible to hydrogenate the polyolefin to give saturated rubbery backbone segments. These materials are usually referred to as SBS, SIS or SEBS thermoplastic elastomers and they can also be functionalized with maleic anhydride.

High-molecular-weight, Monomeric Organic Acids and their Salts

The high-molecular weight, monomeric saturated or unsaturated organic acids of the present invention are fatty acids, particularly stearic, behenic, erucic, oleic, and linoleic acids. Preferably the organic acids are mono-functional. The salts of organic acid of the present invention comprise the salts, particularly the barium, lithium, sodium, zinc, bismuth, chromium, cobalt, copper, potassium, strontium, titanium, tungsten, magnesium or calcium salts, of the fatty acids. Preferably, the fatty acid salt is selected to have the lowest volatility. It may also preferably be chosen so as to maximize COR while minimizing Atti Compression, which has often been called "PGA Compression" in the art.

Ethylene Acid Copolymers and Ionomers

The acid copolymers of this invention are prepared from 'direct' acid copolymers, that is to say copolymers polymerized by adding all monomers simultaneously to a reaction mixture. Direct copolymers are distinct from graft copolymers, in which a monomer or other unit is grafted onto an existing polymer, often by a subsequent free radical reaction. Methods of preparing ionomers are well known, and are described in U.S. Pat. No. 3,264,272 (Rees), for example. Methods of preparing acid copolymers are described in U.S. Pat. No. 4,351,931, for example.

The acid copolymers preferably are alpha olefin, particularly ethylene, $C_{3-8}$ α,β ethylenically unsaturated carboxylic acid, particularly acylic and methacrylic acid, copolymers. They may also contain a third softening monomer such as an alkyl acrylate or methacrylate. The ethylene acid copolymers can be described as an E/X/Y copolymers where E is ethylene, X is the α,β ethylenically unsaturated carboxylic acid, particularly acylic and methacrylic acid, and Y is a softening comonomer such as a $C_1$ TO $C_8$ alkyl acrylate or methacrylate ester. X is preferably present in 4-35 (preferably 6-35, most preferably 8-20) weight percent (wt. %) of the polymer, and Y, when present, is preferably present in a finite amount up to 50 (preferably 5-25, most preferably 11-23) weight percent of the polymer.

Specific acid-containing ethylene copolymers include, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylatel, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl acrylate, ethylene/(meth)acrylic acid/ethyl acrylate, and ethylene/(meth)acrylic acid/methyl acrylate copolymers.

Cation Source

The acid moiety in the ethylene acid copolymer is neutralized by any cation source known in the art. Prior to the addition of sufficient high-molecular weight, monomeric organic acid or salt thereof, the ethylene acid copolymers may optionally be partially neutralized to a level between about 1 and about 100% provided that the level of neutralization is such that the resulting ionomer remains melt-processible. Suitable cations include lithium*, sodium, potassium, magnesium*, calcium*, barium, lead, tin, zinc or aluminum (*=preferred), or a combination of such cations. Particularly preferred cations are selected from the group consisting of alkaline earth metals.

It has been found that, by adding sufficient high molecular weight, monomeric organic acid or salt of organic acid to the acid copolymer or ionomer, the acid copolymer or ionomer can be neutralized without losing processibility to a level above the level that would cause the ionomer alone to become non-melt-processable. That is to say that neutralization of the acid moieties in the acid copolymer from which the ionomer is made can be accomplished to at least 40 to about 100%, preferably at least about 90% to about 100%, and most preferably 100%, without losing processibility. Such high neutralization, particularly to levels greater than 80%, greater than 90% or greater than 95% or most preferably 100% without loss of processibility is accomplished by (a) melt-blending an ethylene α,β ethylenically unsaturated carboxylic acid copolymer or a melt-processable ionomer thereof with an organic acid or a salt of organic acid, and (b) adding a sufficient amount of a cation source (up to 110% of the amount needed to neutralize the total acid in the copolymer or ionomer and organic acid or salt to the desired level) to increase the level of neutralization of all the acid moities therein preferably to greater than 90%, preferably greater than 95%, or preferably to 100%. To obtain 100% neutralization, it is preferred to add a slight excess, say up to 110%, of cation source over the amount stoiciometrically required to obtain 100% neutralization.

Thermoplastic resins, fillers and other ingredients, if included, can be blended in either before, during or after the acid moieties are neutralized to more than 90% orto about 100%. Preferably, thermoplastic resins, along with fillers (particularly those that react with acid) and other ingredients, are blended in after neutralization to a high level (greater than 80%, greater than 90%, greater than 95%, or preferably about 100% neutralization).

Filler

The optional filler component of the subject invention is chosen to impart additional density to blends of the previously described components, the selection being dependent upon the intended use of the composition (e.g. the type of golf ball desired (i.e., one-piece, two-piece, three-piece or intermediate layer), as will be more fully detailed below).

Generally, the filler will be inorganic having a density greater than about 4 gm/cc, preferably greater than 5 gm/cc, and will be present in amounts between 0 and about 60 parts per hundred parts by weight of the ionomer, organic acid and thermoplastic resin. Examples of useful fillers include zinc oxide, barium sulfate, lead silicate and tungsten carbide, tin oxide, as well as the other well known corresponding salts and oxides thereof. It is preferred that the filler materials be non-reactive or almost non-reactive with the polymer components described above when the ionomers are less than completely neutralized. If the ionomers are fully neutralized, reactive fillers may be used. Zinc Oxide grades, such as Zinc Oxide grade XX503R available from Zinc Corporation of America, that do not react with any free acid to cause cross-linking and a concomitant decrease of MI, are preferred, particularly when the ionomer is not fully neutralized.

Other Components

Additional optional additives useful in the practice of the invention include diacids such as adipic, sebasic or dodecane dioic acid or an acid copolymer wax (e.g., Allied wax AC143 believed to be an ethylene/6-18% acrylic acid copolymer with a number average molecular weight of 2,040) which assist in preventing reaction between the filler materials (such as reactive grades of ZnO) and the acid moiety in the ethylene copolymer. Other optional additives include $TiO_2$, which is used as a whitening agent or filler; optical brighteners; surfactants; processing aids; etc.

Combinations of Components

The specific combinations of components used in the practice of the subject invention will in large part be dependent upon the application. The preferred combinations for various types of golf balls (i.e., one-piece, two-piece, three-piece, or multi-layered), are as detailed below.

Three-piece Golf Ball Preferred Embodiments

As used herein, the term "three-piece ball" refers to a golf ball comprising a center, a traditional elastomeric winding wound around the center, and a cover made from any golf ball cover material such as Surlyn® ionomer resin, balata rubber or thermoset/thermoplastic polyurethanes and the like. These three-piece golf balls are manufactured by well-known techniques as described in U.S. Pat. No. 4,846,910 for example.

For purposes of this invention, the center of these three-piece balls is made by injection molding of the compositions of this invention. Those centers are placed in a winding machine in which the end of an elastomeric thread is affixed to the molded center and the thread is wound around the center to a predetermined thickness. A dimple-patterned cover is molded around the wound center.

The center is made of a composition comprising (a) ethylene acid copolymer, (b) 5-35 (alternatively 20-30, or 20-25) wt. % high-molecular weight, monomeric organic acid or salt thereof provided that component (b) does not exceed 50 wt. % of (a) plus (b), (c) 10-35 wt. % (alternatively 25-35 wt. %, preferably 28-35 wt. %) thermoplastic resin, (d) sufficient cation to neutralize 50 to 110 percent of the acid in the acid copolymer and organic acid, and (e) sufficient filler, preferably 40-60 parts per hundred parts by weight of (a) through (d) (alternatively 40-55 parts per hundred and most preferably 50-55 parts per hundred) to adjust the density of the center, preferably to about 1.8 gm/cc, so that the total golf ball weight meets specified limits. The amount of filler (and hence the density of the center) can be adjusted depending on the size, thickness and composition of the other ball components to produce a golf ball weighing about 45-46 grams (i.e., meet standards set by the professional golfers' governing authority).

Preferably, the thermoplastic resin is a thermoplastic elastomer selected from selected from copolyetheramides, copolyetheresters, elastomeric polyolefins, styrenic diene block copolymers or thermoplastic polyurethanes.

A preferred thermoplastic elastomer component is a copolyetherester. A preferred salt of high molecular weight, monomeric organic acid is metal salt of stearic, behenic, oleic, or erucic acid. A preferred acid-containing ethylene copolymer ionomer is an ethylene/methacrylic acid/normal butyl acrylate or ethylene/acrylic acid/normal butyl acrylate terpolymer.

A particularly preferred three piece golf ball comprises a center, an elastomeric winding and a cover wherein the center comprises (a) an ethylene/acrylate ester/acrylic acid copolymer highly neutralized (>80%, >95%, or preferably 100%) with magnesium cation, (b) about 5 to about 10 wt. % magnesium salt of stearic acid, (c) about 10 to about 35 wt. % a copolyetherester having a shore D hardness of 40, (d) sufficient magnesium cation source to highly neutralize (a) and (b), and (e) sufficient ZnO to adjust the density of the composition to about 1.8 gm/cc.

Two-piece Golf Ball Preferred Embodiments

As used herein, the term "two-piece ball" refers to a golf ball comprising a core made from the compositions of the invention, and a cover made from any traditional golf ball cover material as discussed above. These two-piece balls are manufactured by first molding the core from the compositions of the subject invention, positioning these preformed cores in an injection molding cavity using retractable pins, then injection molding the cover material around the core. Alternatively, covers can be produced by compression molding preformed half shells of cover material over the cores.

The core is made of a composition comprising (a) ethylene acid copolymer, (b) 10-45 wt. % (alternatively 20-40 wt. %, preferably 25-37 wt. %) organic acid or salt thereof provided that component (b) does not exceed 50 wt. % of (a) plus (b), (c) 1-30 wt. % (alternatively 1-25 wt. %, preferably 5-20 wt. %) thermoplastic resin, (d) sufficient cation source to neutralize 50 to 110 percent of the acid in (a) and (b), and (e) sufficient filler, preferably 15-35 parts per hundred parts by weight of (a) through (d) (preferably 18-23 parts per hundred), to adjust the density of the core, preferably to about 1.18-1.22 gm/cc, so that the total golf ball weight meets specified limits. The amount of filler can be adjusted to produce a core with a density varying from the 1.18-1.22 gm/cc range depending on the diameter of the core and the thickness and composition of the cover to produce a golf ball meeting the weight limits (45.93 grams) set by the professional golfers' governing authority. Preferably the filler has a density of about 4 gm/cc or greater, more preferably about 5 gm/cc or greater.

Preferably, the thermoplastic resin is a thermoplastic elastomer. A particularly preferred thermoplastic elastomer component is a copolyetherester. A particularly preferred acid-containing ethylene copolymer ionomer is an ethylene/acrylic acid/n-butyl acrylate copolymer ionomer.

The two-piece balls that perform well, as seen in the Examples below, contains a core molded from a composition that comprises (a) ethylene/(meth)acrylic/n-butyl acrylate highly neutralized (>80, >95, preferably 100%) with magnesium cations, (b) 12 to 24 wt. % of the magnesium salt of organic acid, particularly a fatty acid such as stearic acid or oleic acid, (c) 10-35 wt. % copolyetherester, (d) sufficient magnesium cation source to highly neutralize the acid in (a) and (b), and (e) about 22.5 total weight percent ZnO.

A particularly preferred two-piece golf ball has a core density of about 1.18 gm/cc that comprises (a) ionomer that is a partially neutralized ethylene/alkyl(meth)acrylate/(meth)acrylic acid copolymer, (b) salt of the organic acid that is a salt of fatty acid such as stearic or oleic acid; (c) thermoplastic elastomer polymer that is a polyetherester having a shore D hardness of about 30-40, (d) sufficient cation source to neutralize (a) and (b), and (e) filler that is selected from ZnO and BaSO$_4$. Preferably the salt of fatty acid such as stearic or oleic acid is a magnesium salt, the ionomer is an ethylene/(meth)acrylic acid/n-butyl acrylate highly neutralized with Mg cations to form the ionomer, and the filler is ZnO.

A preferred two-piece golf ball comprises a thermoplastic core having a dimple pattern such that when positioned in the ball and covered by the cover having a dimple pattern, the cover thickness in the dimple areas is the about the same as the cover thickness in the non-dimpled areas.

One-piece Golf Ball Preferred Embodiments

As used herein, the term "one-piece ball" refers to a golf ball molded in toto from the compositions of the subject invention, i.e., having neither elastomeric windings nor a cover. The one-piece molded ball will have a traditional dimple pattern and may be clear coated with urethane or be painted for appearance purposes, but such a coating and/or painting will not affect the performance characteristics of the ball. These one-piece balls are manufactured by direct injection molding techniques or by compression molding techniques.

Preferably a one-piece golf ball comprises (a) ethylene acid copolymer, (b) 10-50 wt. % (alternatively 20-40 wt. %, more preferably 25-37 wt. %) organic acid or salt thereof provided that component (b) does not exceed 50 wt. % of (a) plus (b), (c) 1-30 wt. % (alternatively 1-25 wt. %, more preferably 5-20 wt. %) thermoplastic resin, (d) sufficient cation source to neutralize 50 to 110% of the acid in (a) and (b), and (e) sufficient filler, preferably 15-25 parts per hundred parts by weight of (a) through (d) (more preferably 18-22 parts per hundred), to adjust density of ball to 1.14 grams/cubic centimeter (gm/cc) or to a density that results in a golf ball that does not exceed the limitation on weight of golf ball set by the professional golfers' governing authority (USGA—45.93 grams). Preferably the filler has a density of about 4 gm/cc or greater, more preferably 5 gm/cc or greater. Density for larger balls (for example, 1.715 inches, 4.3561 cm) will be lower than the 1.14 gms/cc needed to produce a 45.93 gram standard size ball (1.68 inches, 4.2672 cm.). For larger balls, density can be as low as 1.05 gms/cc, for example. Also, the amount of filler may be adjusted to yield a density of less than 1 gm/cc if balls that float in water are desired.

Again, preferably the thermoplastic resin is a thermoplastic elastomer. A particularly preferred thermoplastic elastomer component is a copolyetherester. A particularly preferred metal salt of an organic acid is magnesium stearate, magnesium oleate, magnesium laurate or magnesium salt of erucic acid. A particularly preferred acid-containing ethylene copolymer ionomer is an ethylene/acrylic acid/n-butyl acrylate copolymer almost totally neutralized with magnesium cations.

The one-piece balls that perform particularly well, as seen in the Examples below, are molded from compositions of the subject invention comprising (a) 29.5-50 wt. % ethylene/acrylic acid/n-butyl acrylate copolymer highly neutralized (>80%, >90%, >95%, or preferably 100% with Mg cations to form the ionomer, (b) 8.5-27 wt. % metal salt of organic acid based on (a), (b) and (c) provided that component (b) does not exceed 50 wt. % of (a) plus (b), (c) about 5-35 wt. % of copolyetherester, (d) sufficient magnesium source to highly neutralize (a) and (b), and (e) about 15-24 wt. % ZnO as filler.

A particularly preferred one-piece ball is one having (a) ethylene/(meth)acrylic/n-butyl acrylate highly neutralized with Mg cations, (b) about 5 to about 40 wt. % magnesium salt of fatty acid such as stearic or oleic acid provided that component (b) does not exceed 50 wt. % of (a) plus (b), (c) 1 to about 35 wt. % polyetherester having a shore D hardness of about 30-40, (d) sufficient magnesium cation source to highly neutralize (a) and (b), and (e) sufficient zinc oxide in an amount up to 60 parts per hundred parts by weight of (a) through (d) to adjust the density of the composition in a range of from about 1.14 to about 1.8 gm/cc to result in a golf ball meeting the weight limits set by the professional golfers' governing authority.

Multi-layer Golf Ball Preferred Embodiments

As used herein, the term "multi-layer ball" refers to a golf ball comprising a core (sometimes referred to as a center), a cover made from any traditional golf ball cover material as discussed above, and one or more mantles between the core and the cover. These multi-layer balls are manufactured by first molding or making the core, typically compression or injection molding a mantle over the core and then compression or injection molding a cover over the mantle.

The multi-layer golf ball having a core and a cover with one or more intermediate layers or mantles between the core and the cover. Both the core and the mantle(s) can comprise the composition of this invention. The amount of filler employed in the core and mantle(s) can be varied from 0 to about 60 parts per hundred parts by weight depending on the size (thickness) of the components and the desired location of the weight in the ball, provided that the final ball meets the required weight limits set by professional golfers' governing authority (45-46 grams). The filler can be used in the core and not in the mantle, in the mantle and not in the core, or in both. Thus, the mantle or the core can comprise (a) ethylene acid copolymer, (b) 5-45 wt. % salt of organic acid provided that component (b) does not exceed 50 wt. % of (a) plus (b), (c) about 1-35 wt. % thermoplastic resin, (d) sufficient cation source to neutralize 50 to 110 (preferably >80%, >90%, >95% or 100%) of the total acid in (a) and (b), and (e) sufficient filler to adjust the density to the desired level. Again, in multi-layer golf balls, preferably the thermoplastic resin is a thermoplastic elastomer. While not intending to be limiting as to possible combinations, this embodiment includes one or more of:
1. a core comprising the same composition used in the three-piece center with a mantle made of any composition known in the art,
2. a core comprising the same composition used in the two-piece core or three-piece center with a mantle made of the composition of this invention with or without filler (acid copolymer, 5-45 wt. % salt of organic acid provided that the organic acid does not exceed 50 wt. % of acid copolymer plus organic acid, 1-35 wt. % thermoplastic resin, sufficient cation source, and up to 60 parts per hundred parts by weight filler (preferably up to 35 parts per hundred)), the total filler in core and mantle adjusted to provide a golf ball of the desired weight, and
3. a core made of any composition (including thermoset compositions such as polybutadiene rubber) with a mantle made of the composition of this invention with or without filler provided that the weight of the finished golf ball meets the required limit.

EXAMPLES

Testing Criteria

In the Examples set out below, a number of testing criteria are utilized in the evaluation of golf ball performance (e.g., percent rebound, coefficient of restitution (COR) and compression).

Percent rebound is determined by dropping the ball or sphere (e.g., three-piece center or two-piece core) from a height of 100 inches (254 cm) and measuring the rebound from a hard, rigid surface such as a thick steel plate or a stone block. An acceptable result is about 65-85%.

COR is measured by firing a golf ball or sphere (e.g., three-piece center or two-piece core) from an air cannon at a velocity determined by the air pressure. The initial velocity generally employed is between 125 to 180 feet/second (38.1-54.86 m/sec). The ball strikes a steel plate positioned three feet away from the point where initial velocity is determined, and rebounds through a speed-monitoring device. The return velocity divided by the initial velocity is the COR. Acceptable results are 0.700-0.810 at 125 ft/sec (38.1 m/sec). Still higher COR's are preferred.

Compression is defined as the resistance to deformation of a golf ball, measured using an Atti machine. An acceptable result is about 70-120.

Initial Velocity, reported in feet/second and measured using a Wilson Initial Velocity Test Machine, is the initial velocity of the ball as it leaves the Test Machine.

Durability is the number of hits to failure of a ball that is fired into a steel plate at 175 feet/second. Test is stopped at 100 hits.

Numbers in parentheses in the tables represent the weight percentage of the component in the blend, unless otherwise indicated.

Two Piece Golf Balls Produced with Thermoplastic Cores

These examples describe the preparation of blends for the core for two piece golf balls, golf balls made therefrom, and the properties of the cores and finished balls. The composition of these blends is shown in Table 2. The blends were made using extrusion conditions shown in Table 1A. The blends were molded into cores using conditions shown in Table 1B. The core is 1.53 inches (3.89 cm) in diameter. Balls were prepared by positioning preformed thermoplastic cores in an injection molding cavity. The cores were centrally positioned in the cavity by the use of retractable pins. A cover of mixed Surlyn® ionomer resin was then injection molded around the core. Properties of the resultant cores or balls are shown in Tables 2A and 2B.

TABLE 1A

EXTRUSION CONDITIONS FOR TWO PIECE CORES

| Screw Speed Rpm | Zone 1 temp ° C. | Zone 2 temp ° C. | Zone 3 temp ° C. | die temp ° C. | Rate lb./hr. | Vacuum inches |
|---|---|---|---|---|---|---|
| 100-300 | 150-170 | 175-190 | 200-220 | 200-230 | 15-25 (6.8-11.34 Kg/hr) | 28 (6.9 kPa) |

TABLE 1B

MOLDING CONDITIONS FOR TWO-PIECE CORES

| | Temp. ° C. |
|---|---|
| Rear | 162 |
| Center | 176 |
| Front | 176 |
| Nozzle | 177 |
| Mold Front/Back | 21/21 |
| Melt | 199 |
| | Pressures Kg/cm² |
| Injection 1st Stage | 86 |
| Injection 2nd Stage | 82 |
| Injection 3rd Stage | 47 |
| | Cycle Times (sec) |
| Hold in 1st Stage | 10 |
| Hold in 2st Stage | 40 |
| Hold in 3st Stage | 50 |
| Cure Time | 20 |
| Screw Retraction | 3.5 |
| Screw Speed | 150 RPM |
| Back Pressure | 19 Kg/square cm. |
| Mold Diameter | 4.01 cm |

*Prototype mold, limited cooling, two cavity

TABLE 2

CORE COMPOSITIONS

| Ex No. | Thermoplastic | Metal salt | Ionomer | Filler |
|---|---|---|---|---|
| 1 | H1 (15) | J (20) | B (47) | F3 (18) |
| 2 | H1 (10) | J (24) | B (48) | F3 (18) |
| 3 | H1 (15) | J (22) | B (45) | F3 (18) |

(Percentages given in parenthesis)
B Ethylene, 17% normal butyl acrylate, 12% acrylic acid 60% neutralized with magnesium ions
H1 Hytrel ® 3078 polyetherester block copolymer available from E. I. du Pont de Nemours and Company
F3 Zinc Oxide, grade XX503R available from Zinc Corporation of America.
J Magnesium stearate available from Witco Corporation

TABLE 2A

PROPERTIES of THERMOPLASTIC CORES

| Ex No. | M.I. (g/10 min) | Atti Compression | Drop Rbn. % | COR @ 125 ft/sec (38.1 m/sec) |
|---|---|---|---|---|
| 1 | 0.53 | 99 | 77 | 0.769 |
| 2 | 0.38 | 102 | 78.2 | 0.778 |
| 3 | 0.50 | 97 | 78.1 | 0.777 |

TABLE 2B

2-PC. BALL PROPERTIES MADE FROM CORES IN TABLE 2A

| Core | Cover | Weight grams | Atti Compression | COR @125 ft/sec (38.1 m/sec) |
|---|---|---|---|---|
| 1 | X | 44.5 | 112 | 0.799 |
| 2 | X | 43.9 | 114 | 0.806 |
| 3 | X | 44.1 | 113 | 0.808 |
| Control* | X | 45.2 | 108 | 0.789 |

X - 50/50 blend of ethylene/19% methacrylic acid zinc ionomer about 36% neutralized and ethylene/19% methacrylic acid sodium ionomer 49% neutralized.
*The control ball core is a Wilson Ultra polybutadiene core.

It can be seen from data that thermoplastic cores give golf balls with a higher resilience then ball produced from the thermoset core.

Examples of One-Piece Golf Balls

Thermoplastic blends of the materials in Table 4 were, in general, melt homogenized using a 3 inch (7.62 cm) electrically heated roll mill. The blends in Examples 5d and 5h were produced by neutralizing the acid copolymer with magnesium 2,4 pentanedionate on a roll mill followed by the addition of the other ingredients. The resulting blends compression molded into one-piece balls had the properties shown in Table 4A.

TABLE 4

ONE PIECE BALL COMPOSITIONS

| Ex No | Thermoplastic | Ionomer | Metal salt | Filler |
|---|---|---|---|---|
| 4a | H1(5) | B(50) | J(27) | F3 (18) |
| 4b | H1(20) | B(44.5) | J(17.5) | F3 (18) |
| 4c | H1(35) | B(29.5) | J(17.5) | F3 (18) |
| 4d | H1(15) | B(47) | J(20) | F3 (18) |
| 4e | H1(15) | B(47) | K(20) | F3 (18) |
| 4f | H1(15) | B(47) | L(20) | F3 (18) |
| 4g | H1(15) | B(47) | M(20) | F3 (18) |
| 4h | H1(15) | B(47) | N(20) | F3 (18) |
| 4i | H1(15) | B(47) | O(20) | F3 (18) |
| 5a | H1(15) | B(47) | P(20) | F3 (18) |
| 5b | H1(15) | B(58.5) | Q(8.5) | F3 (18) |
| 5c | H1(15) | B(50) | Q(17) | F3 (18) |
| 5d | H1(15) | C(47) | J(20) | F3 (18) |
| 5e | G(15) | B(47) | J(20) | F3 (18) |
| 5f | H1(15) | B(47) | R(20) | F3 (18) |

TABLE 4-continued

ONE PIECE BALL COMPOSITIONS

| Ex No | Thermoplastic | Ionomer | Metal salt | Filler |
|---|---|---|---|---|
| 5g | H1(15) | B(47) | S(20) | F3 (18) |
| 5h | H1(15) | B(47) | J(20) | F3 (18) |

Ingredients not previously identified are as follows:
C. Ethylene/20% ethyl acrylate/5% acrylic acid neutralized 60% with Mg.
G. PEBAX ™ 3533, a polyetheramide.
K - magnesium salt of behenic acid prepared by reacting magnesium acetate with behenic acid in an excess of acetic acid under reflux conditions, followed by removing the acetic acid by evaporation.
L - magnesium salt of oleic acid produced in a manner similar to that for K
M - sodium salt of Hoechst Wax S (a $C_{36}$ saturated wax extracted from brown coal).
N - calcium salt of Hoechst Wax S
O - lithium salt of Hoechst Wax S
P - magnesium salt of Hoechst Wax made from Hoechst S in the same manner as the other commercially unavailable salts (see K).
Q - magnesium salt of dodecanedioic acid made from the acid in manner similar to that for K.
R - magnesium salt of erucic acid made in a manner similar to that for K.
S - magnesium salt of lauric acid prepared in a manner similar to that of K.

TABLE 4A

PROPERTIES OF ONE PIECE BALLS

| Ex No | Atti Compression | COR @ 125 ft/sec. (38.1 m/sec) |
|---|---|---|
| 4a | 89 | 0.781 |
| 4b | 77 | 0.764 |
| 4c | 65 | 0.767 |
| 4d | 79 | 0.771 |
| 4e | 81 | 0.749 |
| 4f | 69 | 0.763 |
| 4g | 108 | 0.733 |
| 4h | 108 | 0.725 |
| 4l | 108 | 0.703 |
| 5a | 102 | 0.705 |
| 5b | 85 | 0.675 |
| 5c | 101 | 0.662 |
| 5d | 51 | 0.731 |
| 5e | 72 | 0.772 |
| 5f | 52 | 0.769 |
| 5g | 76 | 0.782 |
| 5h | 56 | 0.772 |

ECHIP Designed Experiment to Optimize COR and Atti Compression

Employing an "experimental design" protocol known as ECHIP®, a copyrighted product of Echip Inc., of Hockessin, Del., an experimental design was used to evaluate the effects of and interactions between magnesium stearate concentration, ionomer concentration and copolyetherester concentration to determine the effect on compression and coefficient of restitution for one-piece compression-molded golf balls of the three-component blend plus 18 wt. % ZnO to adjust density.

Figure 1:
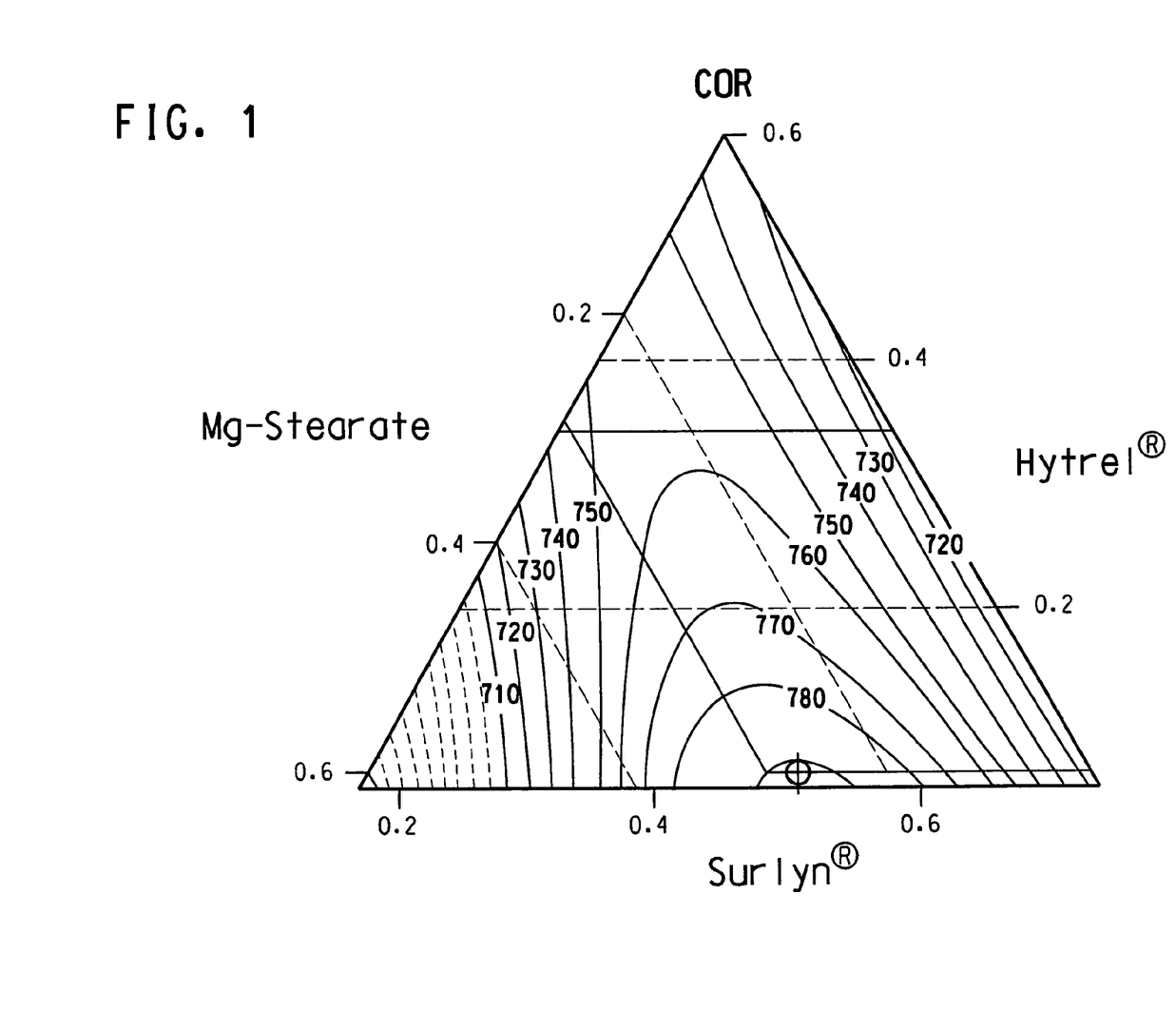
FIG. 1 is a two-dimensional plot of Coefficients of Restitution for one-piece compression-molded golf balls of this invention as determined in an ECHIP study.
Figure 2:
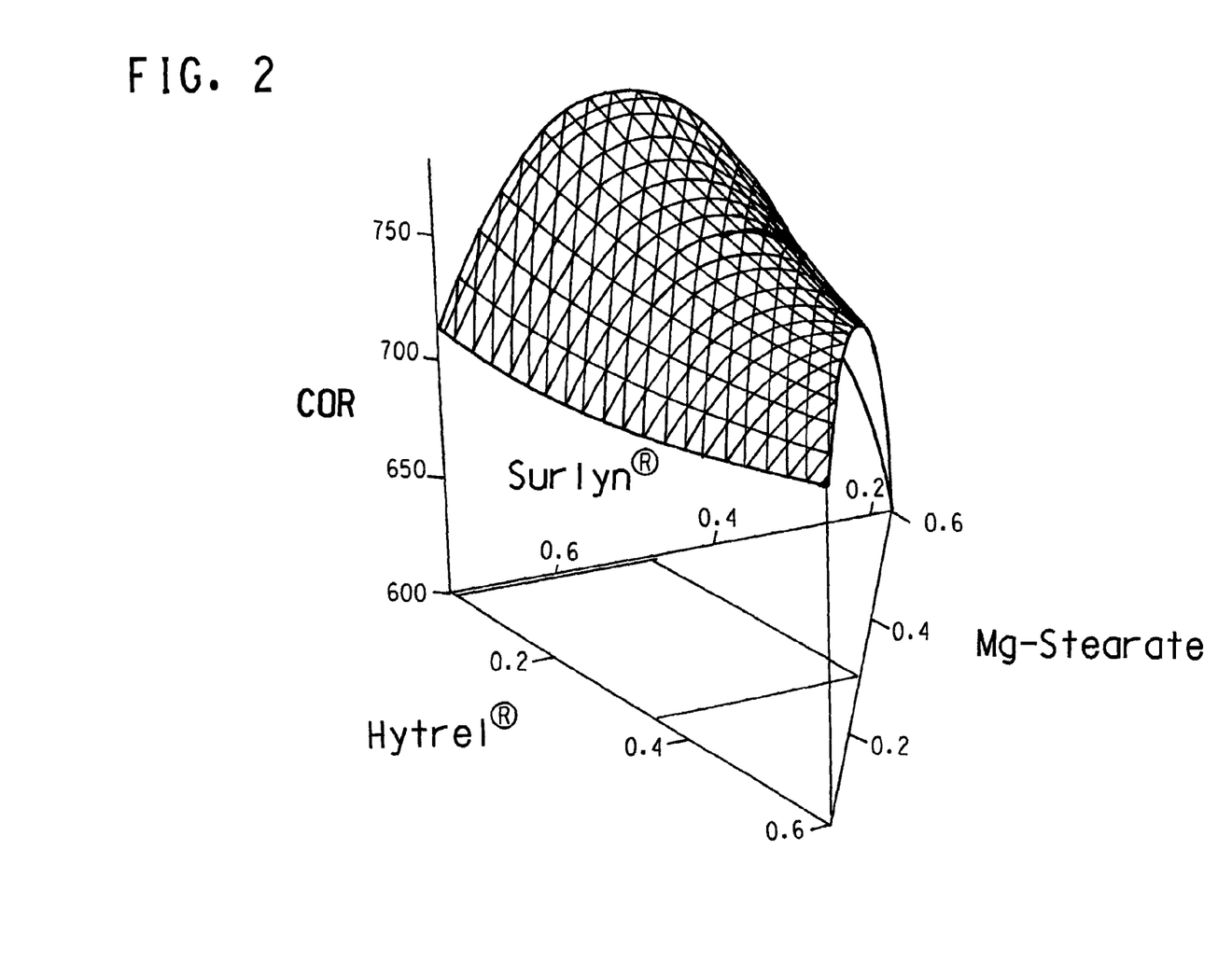
FIG. 2 is a three-dimensional plot of the same information presented in FIG. 1.
Figure 3:
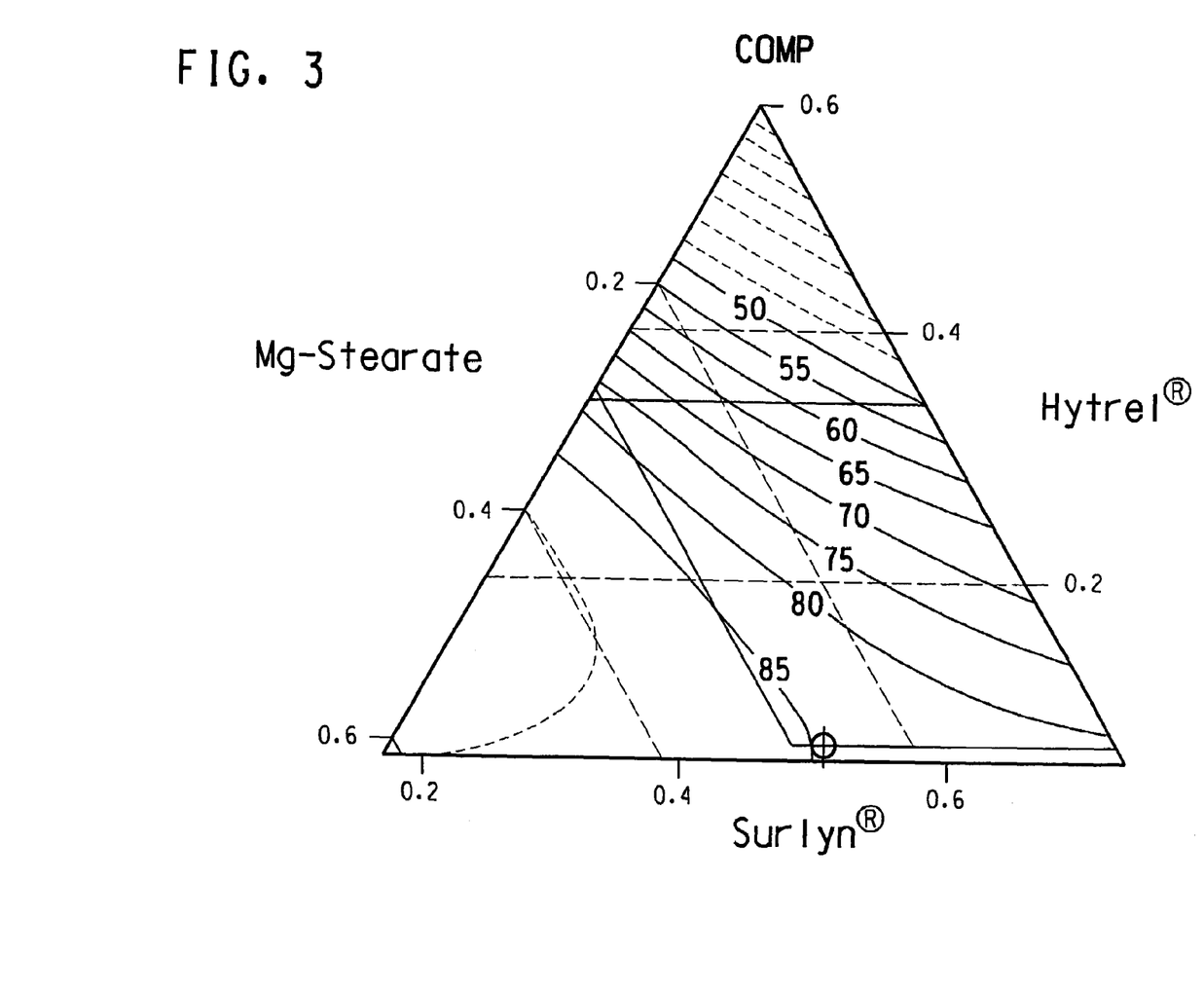
FIG. 3 is a two-dimensional plot of Atti Compression of one-piece compression-molded golf balls of this invention as determined in an ECHIP study.
Figure 4:
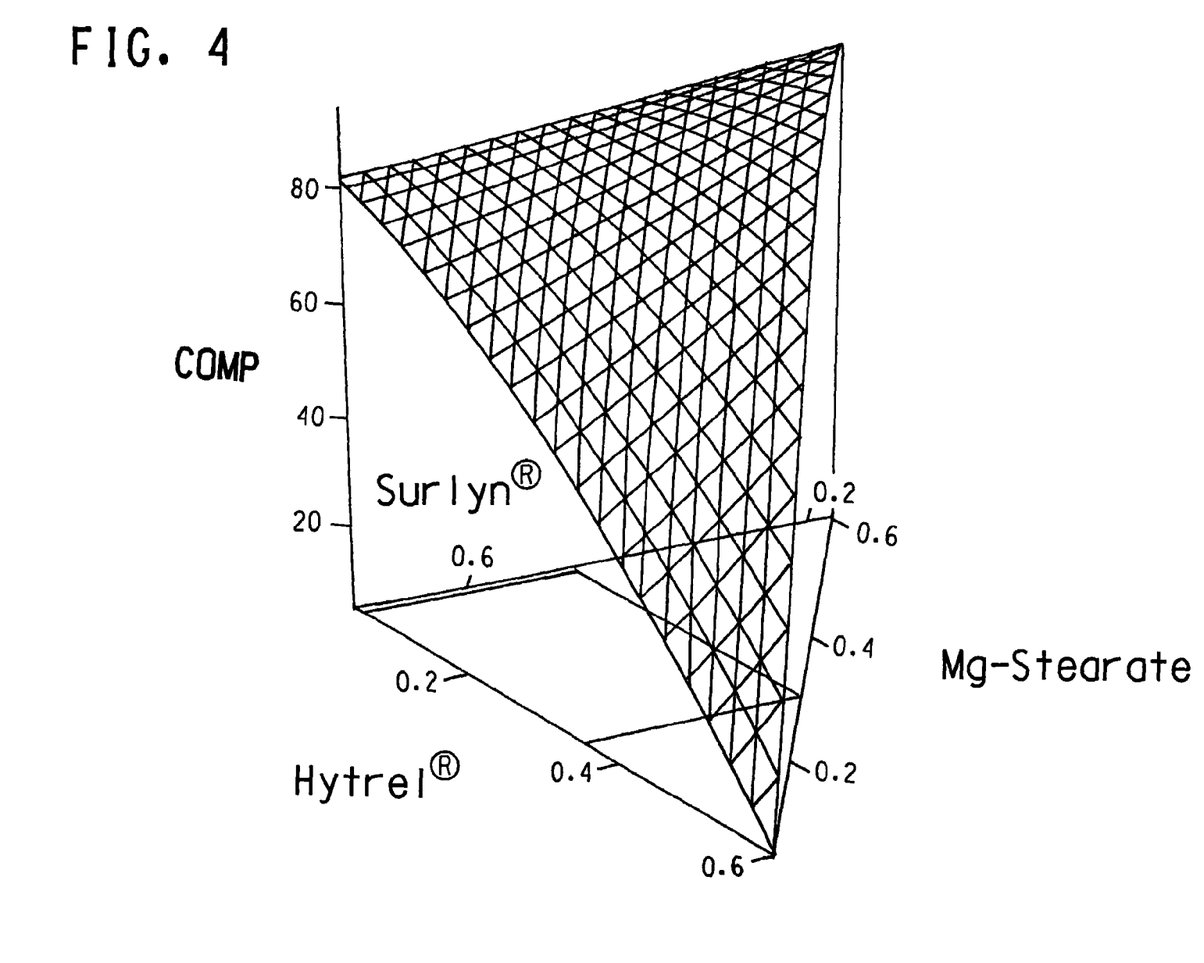
FIG. 4 is a three-dimensional plot of the same information presented in FIG. 3.

From the results displayed in FIGS. 1, 2, 3 and 4, compositions that exhibit preferred compression and coefficient of restitution can be predicted.

TABLE 5

| Ex No. | % Hytrel H1 | % Mg Stearate J | % Ionomer* | Atti comp. | COR |
|---|---|---|---|---|---|
| 6a | 35 | 30% | 17 | 79 | 0.738 |
| 6b | 5 | 5 | 72 | 80 | 0.718 |
| 6c | 20 | 17.5 | 44.5 | 77 | 0.770 |
| 6d | 20 | 30 | 32 | 86 | 0.770 |
| 6e | 35 | 5 | 42 | 53 | 0.716 |
| 6f | 5 | 17.5 | 59.5 | 86 | 0.771 |
| 6g | 35 | 17.5 | 29.5 | 62 | 0.758 |
| 6h | 5 | 30 | 47 | 86 | 0.792 |
| 7a | 20 | 5 | 57 | 68 | 0.703 |
| 7b | 5 | 5 | 72 | 81 | 0.716 |
| 7c | 35 | 30 | 17 | 75 | 0.746 |
| 7d | 20 | 17.5 | 44.5 | 74 | 0.762 |
| 7e | 35 | 5 | 42 | 48 | 0.718 |
| 7f | 5 | 30 | 47 | 83 | 0.789 |

Note:
All samples contain 18% F3 as the zinc oxide filler to adjust for density.
*E/12AA/17nBA neutralized to 60% level with Mg cations.

Retention of Compression and COR Values on Annealing Samples

Table 6A shows the results of annealing one piece golf ball formulations at 60° C. for 48 hours. These results indicate that, unlike the ion-synergy observed in cover materials, the addition of a metal salt of an organic acid performs better if the ion in the organic acid and the ion in the ionomer are the same.

TABLE 6

| Identification | Thermoplastic | Mg Stearate | Ionomer % |
|---|---|---|---|
| 8a | H1 (18) | 20 | B-1 (44) |
| 8b | H1 (20) | 20 | B-1 (42) |
| 9a | H1 (15) | 20 | B (47) |
| 9b | H1 (10) | 21 | B (50) |
| 9c | H1 (10) | 24 | B (48) |

B-1 is the lithium ionomer produced from E/12AA/17nBA neutralized to 60% level.

TABLE 6A

| | Before Annealing | | After Annealing | | | |
|---|---|---|---|---|---|---|
| Ident | Atti Comp. | COR @ 125 ft/sec (38.1 m/sec) | Atti Comp. | COR @ 125 ft/sec (38.1 m/sec) | Delta Comp. | Delta COR |
| 8a | 118 | 0.739 | 111 | 0.692 | −7 | −.047 |
| 8b | 115 | 0.743 | 110 | 0.705 | −5 | −.038 |
| 9a | 72 | 0.782 | 67 | 0.776 | −5 | −.006 |
| 9b | 72 | 0.787 | 69 | 0.780 | −3 | −.007 |
| 9c | 79 | 0.788 | 73 | 0.785 | −6 | −.003 |

Co-Neutralization of Fatty Acids and Ethylene Acid Copolymers

Neutralization of acid copolymers and fatty acids at the same time is advantageous as the materials can be neutralized to about 100% neutralization without losing the melt processability associated with ionomers neutralized to greater than 90%. In addition, neutralizing to 100% reduces the deposits of the fatty acids on the mold vent observed upon molding mixtures with less than 100% neutralization.

Using a Werner & Pfleiderer twin screw extruder it was possible to neutralize the acid copolymer and the stearic acid (or any other fatty acid) at the same time. Hence, 4812 grams of stearic acid were added to 7218 grams of an E/23nBA/9.6MAA polymer. Enough magnesium hydroxide (656.3 grams) was added to this mixture to neutralize 70% of the available acid. The resulting ionomer/fatty acid salt blend had a melt index of 9.0 grams per 10 min (see Ex 10a table 7). Additionally, similar materials with 90 and >95% neutralization were prepared in a similar manner (see Ex 10b & 10c)

Two other resins with the composition cited in Table 7 were reacted with stearic acid and magnesium hydroxide. However, in this case, enough magnesium hydroxide was added to neutralize more than 100% of the available combined acids thus assuring complete neutralization. These mixed anionic ionomers Ex 11a and 11b are listed in Table 7.

Still other resins with the composition cited in Table 7 were reacted with a different level of stearic acid (Ex 12) or with different fatty (oleic) acid (Ex 13 and 14) and enough magnesium hydroxide to neutralize more than 100% of the total available acid to obtain mixed anionic ionomers as indicated.

TABLE 7

MAGNESIUM HIGH-MOLECULAR WEIGHT, MONOMERIC ORGANIC ACID MODIFIED MAGNESIUM IONOMERS

| Ex No | Resin Comp. | Cation Type | Organic Acid (%) | % Neut | M.I. |
|---|---|---|---|---|---|
| 10a | E/23nBA/9.6MAA | Mg | Stearic(40) | 70 | 9 |
| 10b | E/23nBA/9.6MAA | Mg | Stearic(40) | 90 | 5.2 |
| 10c | E/23nBA/9.6MAA | Mg | Stearic(40) | 95 | 3.6 |
| 11a | E/15nBA/8.5AA | Mg | Stearic(40) | >100 | 1.15 |
| 11b | E/16nBA/12AA | Mg | Stearic(40) | >100 | 0.09 |
| 12 | E/15nBA/8.3AA | Mg | Stearic(34) | >100 | .5-.9 |
| 13 | E/15nBA/8.3AA | Mg | Oleic(34) | >100 | .5-.9 |
| 14 | E/12.5AA | Mg | Oleic (40) | >100 | .5-.9 |

Fifty five weight percent of each mixed anionic ionomer in examples 10a, b, and c, and in examples 11a and b was salt and pepper blended with 45 weight percent of a Hytrel®3078/zinc oxide concentrate containing 50% zinc oxide. Using a mixing screw on a 6 ounce injection molding machine, spheres 1.524 to 1.531 inches (3.87-3.89 cm) in diameter were molded using the conditions cited in Table 1B. Cores were evaluated for Atti compression and for COR. Table 8 and 8A show the results of these evaluations.

TABLE 8

TWO PIECE CORES PRODUCED FROM SALT and PEPPER BLENDS of IONOMERS 10a-c and POLYETHERESTERS

| Ex No | Ionomer/ stearate | Hytrel ®/ ZnO Concentrate | M.I. of blend | COR @ 125 ft/sec (38.1 m/sec) | Atti Comp. | Density |
|---|---|---|---|---|---|---|
| 10aa | 10a(55%) | 45% | 1.95 | 0.752 | 103 | 1.16 |
| 10bb | 10b(55%) | 45% | 1.89 | 0.758 | 92 | 1.2 |
| 10cc | 10c(55%) | 45% | 1.49 | 0.759 | 98 | 1.18 |

Table 8A shows the results of cores made in the same fashion from the ionomer/stearate blends 11a and 11b.

TABLE 8A

CORES PRODUCED FROM SALT AND PEPPER BLENDS of IONOMERS 11a & 11b and POLYETHERESTERS

| Ex No. | Ionomer/ stearate | Hytrel ®/ZnO Concentrate | COR @ 125 ft/sec (38.1 m/sec) | Atti Comp. | Density |
|---|---|---|---|---|---|
| 11aa | 11a(55%) | 45% | 0.768 | 110 | 1.18 |
| 11bb | 11b(55%) | 45% | 0.782 | 108 | 1.19 |

Employing the molding conditions set forth in Table 9A, golf ball cores 12-a, 12-b, 12-c, and 13 were produced by injection molding. Salt and pepper blends of the Ionomer/Stearate in the case of 12a, 12b and 12c (or Ionomer/Oleate in the case of 13), the Hytrel®/ZnO Concentrate of 30 wt. % H1 and 70 wt. % F3, and additional Hytrel® polyetherester (H1) in percentages set for in Table 9 were injection molded into spheres of 1.5075-1.5168 inches in diameter. The spheres were tested for Atti Compression, Shore D hardness, and COR @ 125 feet/sec. Results are reported in Table 9B. Also reported for comparison with 12a, 12b, and 12 c is Thermoset Control A (a standard Wilson Ultra Core) believed to be crosslinked polybutadiene, and for comparison with 13 is Thermoset Control B (a Wilson Hyper Ti Max Distance Core) believed to be crosslinked polybutadiene with a lower Atti compression than Thermoset Control A.

TABLE 9

CORES PRODUCED FROM SALT AND PEPPER BLENDS OF RESINS 12 (IONOMER/STEARATE) and 13 (IONOMER/OLEATE) and POLYETHERESTERS

| Ex No | Cores | | Hytrel ®/ZnO Concentrate H1(30%)/F3(70%) | H1 |
|---|---|---|---|---|
| | | Ionomer/ stearate | | |
| 12aa | 12a | 12(41.01) | 25.68 | 33.31 |
| 12bb | 12b | 12(53.22) | 28.82 | 17.82 |
| 12cc | 12c | 12(66.39) | 32.21 | 1.4 |
| | | Ionomer/ oleate | | |
| 13 | 13a | 13(54.6) | 25.9 | 19.5 |

TABLE 9A

MOLDING CONDITIONS FOR TWO-PIECE CORES

| | Temperature ° C. |
|---|---|
| Rear | 177 |
| Center | 190 |
| Front | 190 |
| Nozzle | 190 |
| Mold | 205 |

| | Pressure (psig) |
|---|---|
| Peak Injection Pressure | 2300 |
| Pack Pressure | 1100 |

| | Time (sec.) |
|---|---|
| Injection Time | 10-12 |
| Pack Time | 30 |
| Cooling Time | 120 |

TABLE 9B

| Core | Atti compression | Shore D hardness | COR @125 ft/sec |
|---|---|---|---|
| 12a | 62.2 | 45 | 0.775 |
| 12b | 77.1 | 48 | 0.789 |
| 12c | 91.1 | 50 | 0.796 |
| Thermoset Control A | 80.3 | 58 | 0.791 |
| 13a | 69.4 | | 0.796 |
| Thermoset Control B | 60.5 | | 0.791 |

Two-piece golf balls employing the cores from Table 9 B were made using a Newbury 75 ton injection molding machine equipped with a four-cavity mold having ball cavity diameters of 1.694 inches. The cores were placed in the mold and centered with pins, the mold was closed, the cover materials were injected over the cores, pins were pulled, and balls removed. Operating conditions were as follows:

| Times and Pressures | Temperatures ° C. |
|---|---|
| Pack time: 5.00 seconds | Front 227 |
| Injection time: 1.00 seconds | Barrel 227 |
| Total cycle time: 40 seconds | Rear 191 |
| Cushion: 0.25 inches | Mold 7.2 |
| Feed stroke: 3.5 inches | |
| Peak pressure: 1500 psi | |
| $2^{nd}$ stage hold pressure: 550 psi | |
| Back pressure: 200 psi | |

The resulting two-piece balls were tested for Atti compression, COR at 125 ft./sec., initial velocity in ft./sec. And durability (results are reported in Table 9 C). COR's for examples 12-14 were run on a different COR machine than others in this case. Results should be compared only with internal controls associated with the examples.

TABLE 9C

TWO PIECE GOLF BALLS PRODUCED FROM THERMOPLASTIC CORES 12 A, 12 B, 12 C, and 13 A

| CORE NO (COVER TYPE) | Atti compression | COR @125 ft/sec | Initial Velocity Ft/sec | Durability No. of hits to break |
|---|---|---|---|---|
| 12a (WW) | 89.7 | 0.800 | 255.9 | 43.3 |
| 12b (WW) | 99.7 | 0.804 | 255.7 | 64.7 |
| 12c (WW) | 108.7 | 0.806 | 255 | 99.8 |
| CONT A (WW) | 102.4 | 0.816 | 257 | 49 |
| 12a (XX) | 86.3 | 0.790 | 255.2 | 31.8 |
| 12b (XX) | 94.2 | 0.801 | 255.6 | 76.8 |
| 12c (XX) | 106.4 | 0.801 | 254.9 | 99.0 |
| CONT A (XX) | 101.3 | 0.808 | 257 | 57.6 |
| 12a (YY) | 78.3 | 0.772 | 252.0 | 84.3 |
| 12b (YY) | 86.8 | 0.782 | 252.9 | 99 |
| 12c (YY) | 98.4 | 0.798 | 252.8 | 100 |
| CONT A (YY) | 89.1 | 0.790 | 253.5 | 66.2 |
| 13a (YY) | 72 | 0.799 | 254 | |
| CONT B (YY) | 66 | 0.792 | 253.6 | |
| 13a (ZZ) | 88 | 0.822 | 257 | |
| CONT B (ZZ) | 87 | 0.822 | 257 | |

TABLE 9C-continued

TWO PIECE GOLF BALLS PRODUCED FROM THERMOPLASTIC CORES 12 A, 12 B, 12 C, and 13 A

| CORE NO (COVER TYPE) | Atti compression | COR @125 ft/sec | Initial Velocity Ft/sec | Durability No. of hits to break |
|---|---|---|---|---|
| 13a (aa) | 71 | 0.811 | 256.2 | |
| CONT B (aa) | 68 | 0.811 | 255.1 | |

Cover compositions:
WW = 50/50 Blend of RR/SS – Shore D 71 (on ball);
XX = 50/50 Blend of Surlyn ® 8940 (E/15% MAA, 29% Na Neutralized)/Surlyn ® 9910 (E/15% MAA, 58% Zn neutralized – Shore D 66 (on ball);
YY = 35/65 Blend of RR/GG – Shore D 57 (on ball);
ZZ = 60/40 Blend of RR/SS – Shore D 71 (on ball);
aa = 30/70 Blend of Resin 14/Resin 13.

Example 14

Multi-Layered Solid Golf Balls with Modified Ionomer Mantles

The multi-layer golf balls of this set of examples are made by methods known in the art, for example, in U.S. Pat. No. 5,314,187, dated May 24, 1994, and U.S. Pat. No. 5,255,922, dated Oct. 26, 1993.

In particular, the golf balls in this set of examples were produced by injection molding a mantle with a thickness of 0.025 to 0.030 inches over solid polybutadiene centers with a diameter of 1.52 inches (see formulation 222) using the conditions in Table 10. These two-piece cores (center plus mantle) were subsequently covered with a mixed thermoset polyisoprene/polybutadiene thermoset cover (see formulation 333). The resulting balls were compared with ball having a standard mixed ionomer mantle.

Formulation 222 Centers for Multi Layered Balls

| | PARTS |
|---|---|
| Enichem BR - 40 Polybutadiene | 100 |
| SR-416 Zinc Diacrylate | 20 |
| Zinc Stearate | 3 |
| Zinc Oxide | 5 |
| Barytes | 30 |
| Triganox 29/40 peroxide | 1.25 |

TABLE 10

CONDITIONS TO MOLD MANTLES OVER THERMOSET CENTERS

| | Temperature ° C. |
|---|---|
| Rear | 191 |
| Center | 243 |
| Front | 243 |
| Nozzle | 243 |
| Mold | 7.2 |

| | Pressure (psig) |
|---|---|
| Peak Injection Pressure | 2300 |
| Pack Pressure | 700 |

| | Time (sec.) |
|---|---|
| Injection Time | 4 |
| Pack Time | 30 |
| Cooling Time | 42 |

The thermoset centers were placed in a mold, centered by pins, the mold was closed, the thermoplastic materials were injected into the cavities, the pins were retracted and the multilayered cores were removed and covered with the materials identified as below as Formulation 333 by compression molding half shells over the cores. These balls were evaluated for Atti compression, COR and initial velocity (see Table 12)

Formulation 333 Covers for Multilayered Balls

|  | Parts by weight |
|---|---|
| TP-301 Trans-Polyisoprene | 60 |
| Budene 1207 Polybutadiene | 40 |
| SR416D Zinc Diacrylate | 35 |
| Titanium dioxide | 17.15 |
| Zinc Stearate | 1.57 |
| Zinc Oxide | 3.3 |
| Varox 230XL peroxide | 2.5 |
| Wingstay L-HLS antioxidant | 0.2 |

TABLE 11

MANTLES FOR MULTI LAYERED BALLS

| MANTLE | IONOMER/STEARATE NO. 12 | HYTREL ® 3078 (H1) |
|---|---|---|
| Mantle A | 66.67% | 33.33% |
| Mantle B | 80% | 20% |
| Mantle C | 86% | 14% |
| Control | 60% RR | 40% SS |

TABLE 12

MULTI LAYERED BALLS

| Center | Mantle | Atti Comp. | COR @ 125 | I.V. |
|---|---|---|---|---|
| Form. 222 | A | 61.5 | 0.798 | 255.5 |
| Form 222 | B | 68 | 0.804 | 256.1 |
| Form. 222 | C | 68.8 | 0.800 | 256.3 |
| Control* |  | 59 | 0.786 | 252.6 |

*Wilson Smart Core Balata Distance Ball with a 60/40 blend of RR/SS as mantle, Form. 333 as cover, and a core believed to be similar in composition to Form. 222.

As can be seen form the data in Table 12, the present invention provides an improvement in COR and IV without a significant gain in Atti compression. Spin data also looks good on these balls.

Blends of Fatty Acid Salts and Ionomers with Alternative Soft Resilient Thermoplastic Resins The polyetherester thermoplastic elastomer described in Examples 1 through 14 can be replaced with a number of alternative soft resilient thermoplastic resins. In Examples 15aa through 16bb, we the see the results of the use of such blends in cores. All of the blends cited in Tables 13A and 13B were produced by extrusion compounding followed by injection molding. Parenthetical numbers are the weight percent of component in final blend. Conditions cited in Tables 1A and 1B were used to extrusion compound and injection mold for these examples.

TABLE 13A

BLENDS OF IONOMERS, FATTY ACID SALTS AND ALTERNATIVE THERMOPLASTIC RESINS.

| Ex No | Ionomer | Fatty acid salt | Resin | Process Aid | Filler |
|---|---|---|---|---|---|
| Control | AA(76.3) | none | None | FF(6.1) | F3(13.8)/EE(3.8) |
| 15-a | AA(55.3) | BB(8.3) | CC(19.3) | FF(4.4) | F3(9.9)/EE(2.8) |
| 16-a | GG(46.3) | BB(19.9) | CC(20.8) | II (0.5) | F3(10.2)/EE(2.3) |
| 16-b | GG(41.4)/HH(13.8) | BB(8.3) | CC(19.3) | FF(4.4) | F3(10)/EE(2.8) |
| 17-a | GG(47.2) | BB(20.6) | JJ(8.3) | None | F3(23.9) |
| 17-b | GG(47.2) | BB(20.6) | KK(8.3) | None | F3(23.9) |
| 17-c | GG(47.2) | BB(20.6) | H1(8.3) | None | F3(23.9) |
| 17-d | GG(47.2) | BB(20.6) | MM(8.3) | None | F3(23.9) |
| 17-e | GG(47.2) | BB(20.6) | NN(8.3) | None | F3(23.9) |
| Control | GG(84.1) | none | None | None | F3(12.95)/EE(2.95) |
| 18-a | GG(50.0) | OO(21.5) | PP(15) | None | F3(11.0)/EE(2.5) |
| 18-b | GG(41.2) | OO(17.7) | PP(30) | None | F3(9.0)/EE(2.1) |
| 19-a | GG(19.8)/QQ(23) | OO(18.4) | TT(23) | None | F3(15.8) |
| Control | GG(29.4)/RR(29.4) | OO(25.3) | None | None | F3(15.9) |
| 19-b | GG(19.8)/RR(23) | OO(18.4) | TT(23) | None | F3(15.8) |
| 19-c | GG(20)/RR(20) | OO(17.3) | TT(26.7) | None | F3(16) |
| 20-a | GG(20)/SS(24) | OO(16) | TT(16)/UU(5) | None | F3(19) |
| 20-b | GG(20)/QQ(23) | OO(16) | TT(23) | None | F3(18) |

Ingredients not previously identified are as follows:
AA - E/23nBA/9.6 MAA neutralized to about 50% with zinc cations available from E. I. du Pont de Nemours and Company as Surlyn ® 9320
BB - Calcium salt of stearic acid available from Witco Co.
CC - Nordel ® 2470 EPDM based on 70% ethylene, 24% propylene, 5.95% 1,4-hexadiene and <.05% norbornadiene available from DuPont Dow Elastomers LLC.
EE - Titanium dioxide R960 available from E. I. du Pont de Nemours and Company
FF - Acid-containing ethylene copolymer wax consisting of 85% ethylene and 15% acrylic acid available from Allied Signal as AC143 wax

TABLE 13A-continued

BLENDS OF IONOMERS, FATTY ACID SALTS AND ALTERNATIVE THERMOPLASTIC RESINS.

| Ex No | Ionomer | Fatty acid salt | Resin | Process Aid | Filler |
|---|---|---|---|---|---|

GG - E/23 nBA/9.6MAA neutralized to about 50% with magnesium cations available from E. I. du Pont de Nemours and Company as Surlyn ® 6320.
HH - Ethylene copolymer ionomer containing 85% ethylene and 15% methacrylic acid neutralized about 56% with sodium cations and available from E. I. du Pont de Nemours and Company as Surlyn ® 8945
II - Adipic acid
JJ Engage ® 8180 grafted with 2% maleic anhydride and available from DuPont of Canada as Fusabond ® 493D
KK Nordel ® IXP3745P grafted with 1.8% maleic anhydride available from DuPont of Canada as Fusabond ® 503D5
MM - An ethylene octene copolymer containing 40% octene produced with metallocene polymerization catalyst with a 0.5 melt index and a density of 0.863 g/cc. available from the DuPont Dow Elastomers LLC as Engage ® 8180
NN - EPDM elastomer containing 69% ethylene 30.5% propylene 0.5% norbornadiene produced with a metallocene catalyst and available from DuPont Dow Elastomers LLC as Nordel ® IPX3745P
OO - Magnesium Stearate available from Witco Co.
PP - Maleic anhydride grafted block ABA styrene ethylene butene copolymer available from Shell Chemicals and sold as Kraton ® G1901.
QQ - Ethylene methacrylic acid copolymer containing 15% methacrylic neutralized about 55% with magnesium ions to an MI of 0.9, available from E. I. du Pont de Nemours and Company as Surlyn ® 6910.
RR - Ethylene acid copolymer containing 19% methacrylic acid neutralized 37% with sodium ions, available from E. I. du Pont de Nemours and Company as Surlyn ® 8140.
SS - Ethylene acid copolymer containing copolymer containing 19% methacrylic acid 40% neutralized with magnesium ions to an MI of 1.1, available from E. I. du Pont de Nemours and Company as Surlyn ® 6120.
TT - EPDM elastomer containing 71% ethylene 28.5% propylene, 0.5% norbornene produced with a metallocene catalyst and available from DuPont Dow Elastomers LLC as Nordel ® IPX3720P.
UU - Maleic anhydride grafted copolymer containing 0.9% maleic anhydride grafted on to an ethylene copolymer containing 30% propylene available from DuPont of Canada as Fusabond ® MF416D

TABLE 13B

RESULTS ON SPHERES MOLDED FROM COMPOSITIONS CITED IN TABLE 13A

| Ex No | Atti comp, | COR @125 ft/sec (38.1 m/sec) |
|---|---|---|
| Control | 81 | 0.629 |
| 15-a | 83 | 0.709 |
| 16-a | 73 | 0.725 |
| 16-b | 91 | 0.715 |
| 17-a | 126 | 0.736 |
| 17-b | 119 | 0.738 |
| 17-c | 129 | 0.741 |
| 17-d | 124 | 0.741 |
| 17-e | 123 | 0.742 |
| Control | 72 | 0.669 |
| 18-a | 67 | 0.740 |
| 18-b | 54 | 0.700 |
| 19-a | 95 | 0.735 |
| Control | 140 | 0.743 |
| 19-b | 119 | 0.738 |
| 19-c | 108 | 0.719 |
| 20-a | 61 | 0.731 |
| 20-b | 95 | 0.735 |

The invention claimed is:

1. A golf ball comprising a cover and a core, said core comprising
   a) an acid copolymer of the composition E/X/Y wherein E represents copolymerized residues of ethylene, X represents copolymerized residues of an α,β ethylenically unsaturated carboxylic acid, and Y represents copolymerized residues of a $C_1$-$C_8$ alkyl acrylate or alkyl methacrylate, and further wherein the amount of X is 4-35 wt. % of the acid copolymer, and the amount of Y is 0-50 wt. % of the acid copolymer;
   b) about 10 to about 45 wt. % of a high molecular weight, monomeric organic acid or salt thereof based on total weight of components a), b), and c) provided that component (b) does not exceed 50 wt. % of (a) plus (b);
   c) about 1 to about 35 wt. % of a thermoplastic resin;
   d) a cation source present at a level sufficient to neutralize 95 to 110% of the combined acid content of components a) and b); and
   e) zero to about 60 wt. % of a filler based on weight of components a) plus b) plus c) plus e);
   wherein the filler (e) is present in a type and amount sufficient to achieve a density between the density of the composition without filler and 1.8 grams per cubic centimeter; and
   wherein the core has a dimple pattern such that when positioned in the ball and covered by the cover having a dimple pattern, the cover thickness in the dimple areas is the about the same as the cover thickness in the non-dimpled areas.

2. A center, core, or mantle of a golf ball or a one-piece golf ball, said center, core mantle or one-piece golf ball comprising
   a) an acid copolymer of the composition E/X/Y wherein E represents copolymerized residues of ethylene, X represents copolymerized residues of an α,β ethylenically unsaturated carboxylic acid, and Y represents copolymerized residues of a $C_1$-$C_8$ alkyl acrylate or alkyl methacrylate, and further wherein X is present in an amount of 4-35 wt. % of the acid copolymer, and Y is present in a finite amount up to 50 wt. % of the acid copolymer;

b) about 10 to about 45 wt. % of a high molecular weight, monomeric organic acid or salt thereof based on total weight of components a), b), and c) provided that component (b) does not exceed 50 wt. % of (a) plus (b);

c) about 1 to about 35 wt. % of a thermoplastic resin;

d) a cation source present at a level sufficient to neutralize about 50 to about 110% of the combined acid content of components a) and b); and e) zero to about 60 wt. % of a filler based on weight of components a) plus b) plus c) plus e).

3. The center, core, or mantle of a golf ball or the one-piece golf ball of claim 2 wherein the thermoplastic resin is selected from the group consisting of copolyetheresters, copolyetheramides, elastomeric polyolefins, styrene diene block copolymers, polyurethanes, polyamides, polyesters, polyolefins, ethylene copolymers, anhydride modified ethylene or propylene homopolymers and copolymers, and metallocene polyethylene.

4. The center, core, or mantle of a golf ball or the one-piece golf ball of claim 2 wherein the thermoplastic resin is a thermoplastic elastomer.

5. The center, core, or mantle of a golf ball or the one-piece golf ball of claim 4 wherein the thermoplastic elastomer is selected from the group consisting of copolyetheresters, copolyetheramides, elastomeric polyolefins, styrene diene block copolymers and thermoplastic polyurethanes.

6. The center, core, or mantle of a golf ball or the one-piece golf ball of claim 2 wherein the filler (e) is present in a type and amount sufficient to achieve a density between the density of the composition without filler and 1.8 grams per cubic centimeter.

7. A multi-layer golf ball having a core and a cover with one or more intermediate layers or mantles between the core and the cover, the core and the mantles being independently or both selected from the cores and mantles of claim 6 wherein the filer is sufficient to adjust the density of the core or mantle or both in which the composition is used to a level such that the golf ball has a density of 1.14 gms/cc.

8. The multi-layer golf ball of claim 7 wherein the mantle(s) and the core independently or both comprise an acid copolymer (a) selected from ethylene acrylic acid and ethylene methacrylic acid, about 10 to about 30 wt. % of monomeric organic acid or salt thereof (b) based on weight of (a), (b) and (c), about 1 to about 35 wt. % thermoplastic resin (c) based on weight of (a), (b) and (c), and up to 60 parts filler (e) per hundred parts of (a) through (d) by weight.

9. A two-piece golf ball comprised of a core of claim 6 and a cover wherein the filler is sufficient to adjust the density of the core to about 1.18 gm/cc.

10. A two-piece golf ball comprising a cover and a core according to claim 6, wherein the core has a dimple pattern such that when positioned in the ball and covered by the cover having a dimple pattern, the cover thickness in the dimple areas is the about the same as the cover thickness in the non-dimpled areas.

* * * * *